April 13, 1965   D. T. McGREGOR   3,177,983
AUTOMATIC SLACK ADJUSTER FOR BRAKES
Filed Feb. 25, 1963

INVENTOR.
DONALD T. McGREGOR
BY
Lyon & Lyon
ATTORNEYS 3,177,983
AUTOMATIC SLACK ADJUSTER FOR BRAKES
Donald T. McGregor, % McGregor Manufacturing Co., 2812 Newell St., La Crescenta, Calif.
Filed Feb. 25, 1963, Ser. No. 260,585
4 Claims. (Cl. 188—196)

This invention relates to automatic slack adjusters for brakes, and included in the objects of this invention are:

First, to provide an automatic slack adjuster which is an improvement of the type of slack adjuster disclosed in the Kirkland B. MacDougall, Patent No. 2,752,009, issued June 26, 1956.

Second, to provide an automatic slack adjuster which may be readily and quickly installed by substitution of a few simple parts for parts of a conventional brake-operating mechanism.

Third, to provide an automatic slack adjuster which is so arranged that the internal parts of the adjuster, especially the ratcheting mechanism, may be maintained in a lubricated condition, and wherein external dirt and the like is excluded.

Fourth, to provide an automatic slack adjuster which incorporates a novel linkage adjustment to permit fine setting of the brake adjuster to meet various operating conditions.

With the above and other objects in view as may appear hereinafter, reference is directed to the accompanying drawings in which.

Figure 1:
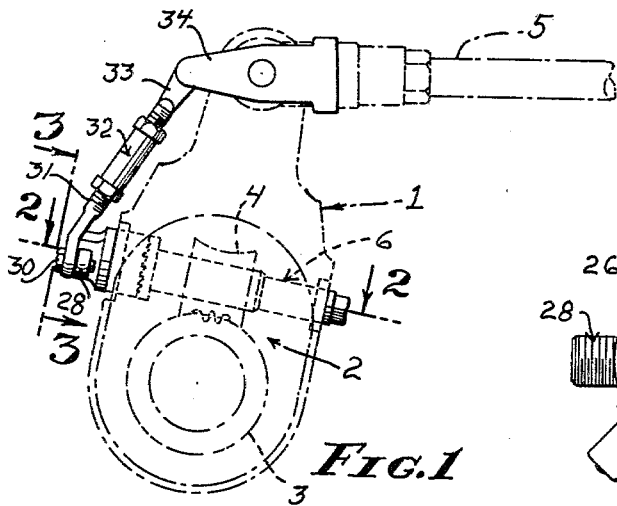
FIGURE 1 is fragmentary view indicating by broken lines portions of the brake operating mechanism and indicating by solid lines the automatic slack adjuster.
Figure 3:
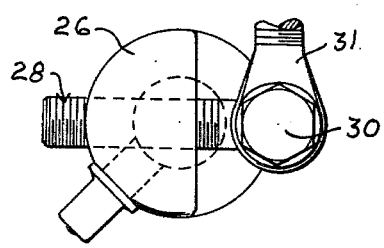
FIGURE 3 is a fragmentary end view thereof taken through lines 3—3 of FIGURE 1.

The conventional brake operating mechanism in which the automatic slack adjuster is incorporated is more fully disclosed in the aforementioned Patent 2,752,009. The conventional brake operating mechanism includes a shaft which is adapted to be oscillated so as to move a cam which operates to spread the brake shoes against the brake drum. The shaft is attached to a lever structure 1 which incorporates a casing or housing at 2 containing a worm gear 3 and a worm 4 which are employed in the conventional brake operating mechanism for the purpose of effecting adjustment. Conventionally, this adjustment is manual. The extended end of the lever structure is attached to an operating rod 5.

In the exercise of the present invention, a shaft 6 is substituted for the conventional shaft on which the worm 4 is mounted. The shaft 6 is provided with a central portion 7 dimensioned for a press fit connection with the worm 4. At one side of the central portion 7 the shaft 6 is reduced in diameter to form a journal portion 8 which protrudes from the casing or housing 2 that is provided with a hexagonal end 9 to receive a wrench for manual rotation of the shaft 6.

The opposite end of the shaft 6 is provided with a ratchet flange 10 having axially directed ratchet teeth disposed in a circle. Rotatably mounted in the casing at 2 outwardly of the ratchet flange 10 is a ratchet body 11 having a socket 12 therein. The rim of the ratchet body surrounding the socket 12 forms a ratchet 13 engageable with the ratchet flange 10.

The end of the shaft 6 having the ratchet flange at 10 is provided with a socket 14 which receives a connecting pin 15 removably secured in place by a cross pin 16. The connecting pin 15 extends into the socket 12 and is provided with a head 17. The pin is surrounded by a collar 18 which is held within the socket 12 by a retainer ring 19. A spring 20 is interposed between the collar 18 and the head 17 of the connecting pin 15 so as to exert a force against the collar 18 which urges the ratchet 13 into engagement with the ratchet flange 10.

The socket 12 is intersected by a lubricant opening 21 which receives a lubricant fitting at 22 so that the socket 12 may be filled with a lubricant. For this purpose the head 17 is provided with a notch 23 so that the lubricant may fill all parts of the socket. The outer dimensions of the shaft 6 and the ratchet body 11 correspond to those of the conventional manual adjustment means which they replace. The shaft 6 and ratchet body 11 are provided with seal rings at 24 and 25 preferably of a V-cross section and set in such a position as to exclude dirt and liquids from entering the casing or housing 2.

The ratchet body 11 is provided with a short eccentrically located extension 26 which is provided with a screw-threaded crossbore 27. The crossbore 27 receives a screw lever body 28 having an eyelet 29 in one end.

The screw lever 28 is joined through the eyelet 29 and a connecting pivot 30 to a link 31 forming a part of a turnbuckle 32. The opposite end of the turnbuckle is provided with a second link 33, which is pivotally connected to an extension arm 34 fastened to the operating rod 5.

Figure 2:
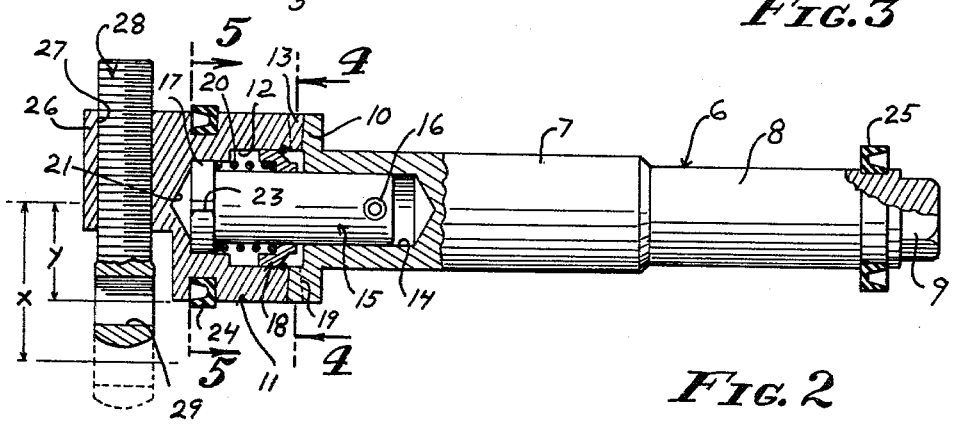
FIGURE 2 is an enlarged partial elevational view of the automatic slack adjuster taken through lines 2—2 of FIGURE 1.
Figure 5:
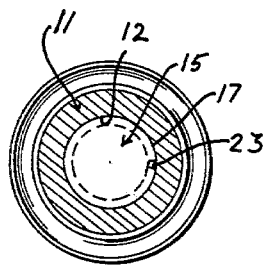
FIGURE 5 is a sectional view taken through 5—5 of FIGURE 2.
Figure 4:
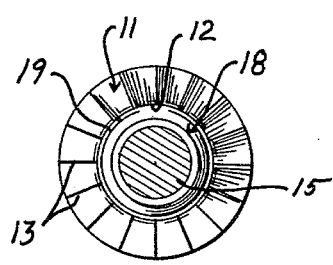
FIGURE 4 is a sectional view taken through 4—4 of FIGURE 2.

Operation of the automatic slack adjuster is as follows:

The conventional manual adjustment means is removed and the assembly shown in FIGURE 2 is substituted. The extension arm 34 is fastened to the operating rod 5, and the turnbuckle 32 is interposed between the extension arm 34 and the screw lever 28. The turnbuckle 32 is adjusted as to length. It is important that the amount of rotation of the ratchet body 11 be accurately adjusted. This is made possible by the screw lever 28 and by the use of fine screw threads. By rotation of the screw lever when disconnected from the turnbuckle 32, the effective length of the lever may be adjusted in increments of one-half of a screw pitch. The range of adjustment may be substantial, depending upon only the length of the screw lever 28. For example, as shown in FIGURE 2, the effective length of the lever may vary between the shorter distance Y and the longer distance X.

Initially the automatic adjuster is set so that, for the normal length of travel of the operating rod 5, the movement of the ratchet body 11 is less than the distance between the teeth of the ratchet. As the brake shoes wear, the length of stroke of the operating rod 5 increases gradually until the oscillating movement of the ratchet body 11 exceeds the ratchet teeth spacing, so as to advance the adjustment an amount corresponding to one ratchet tooth and causing the operating rod 5 to return to its normal shorter stroke.

It will be noted that by provision of the socket 12 and the arrangement of the connecting pin 15, the moving parts of the automatic brake adjuster may be readily maintained in a lubricated condition.

While particular embodiments of the present invention have been shown and described, it will be obvious to those skilled in the art that changes and modifications may be made without departing from this invention in its broader aspects, and therefore the aim in the appended claims is to cover all such changes and modifications as fall within the true spirit and scope of this invention.

What is claimed is:

1. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, and a worm for advancing the worm gear, of an automatic slack adjuster for turning said worm, comprising:
   (a) a single shaft extending through said worm and having an integral ratchet flange at one end;
   (b) a ratchet body disposed outwardly of said ratchet flange and having a ratchet coacting with said flange;
   (c) the confronting ends of said shaft and ratchet body having aligned sockets;
   (d) a pin extending from said shaft into said sockets;
   (e) yieldable means interposed between the extended end of said pin and a portion of said ratchet body adjacent said ratchet flange to urge said ratchet into engagement with said ratchet flange;
   (f) and means interconnecting said ratchet housing and brake operating mechanism to effect oscillation of said ratchet body thereby to advance said worm shaft and worm.

2. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, and a worm for advancing the worm gear, of an automatic slack adjuster for turning said worm, comprising:
   (a) a single piece shaft extending through said worm, one end thereof protruding from said housing for manual rotation of said shaft and worm, the other end of said shaft terminating in an integral ratchet flange disposed within said housing;
   (b) a pin secured to said shaft extending beyond said ratchet flange and terminating in a head;
   (c) a ratchet body having a socket for receiving said pin and a ratchet element engageable with said ratchet flange;
   (d) means forming an internal shoulder within said ratchet body socket;
   (e) a spring interposed between the head of said pin and said shoulder to urge said ratchet flange and ratchet element into mutual engagement;
   (f) and means interconnecting said ratchet body and brake operating mechanism to effect oscillation of said ratchet body thereby to advance said worm shaft and worm.

3. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, and a worm for advancing the worm gear, of an automatic slack adjuster for turning said worm, comprising:
   (a) a single piece shaft extending through said worm, one end thereof protruding from said housing for manual rotation of said shaft and worm, the other end of said shaft terminating in an integral ratchet flange disposed within said housing;
   (b) a pin secured to said shaft extending beyond said ratchet flange and terminating in a head;
   (c) a ratchet body having a socket for receiving said pin and a ratchet element engageable with said ratchet flange;
   (d) means forming an internal shoulder within said ratchet body socket;
   (e) a spring interposed between the head of said pin and said shoulder to urge said ratchet flange and ratchet element into mutual engagement;
   (f) a screw-threaded lever pin secured in said ratchet body for radial adjustment to form a lever of variable length;
   (g) an extension mounted on the rod of said brake operating mechanism;
   (h) and a link joining said lever pin and extension to effect oscillation of said ratchet body with operation of said brake thereby to advance said worm to take up brake slack.

4. The combination with a brake operating mechanism having a brake actuating shaft, an oscillatable lever and reciprocable rod for oscillating said shaft, wherein the lever includes a housing containing a worm gear for adjusting the brake actuating shaft to take up slack due to wear of the brakes, and a worm for advancing the worm gear, of an automatic slack adjuster for turning said worm, comprising:
   (a) a single piece shaft extending through said worm, one end thereof protruding from said housing for manual rotation of said shaft and worm, the other end of said shaft terminating in an integral ratchet flange disposed within said housing;
   (b) a pin secured to said shaft extending beyond said ratchet flange and terminating in a head;
   (c) a ratchet body having a socket for receiving said pin and a ratchet element engageable with said ratchet flange;
   (d) means forming an internal shoulder within said ratchet body socket;
   (e) a spring interposed between the head of said pin and said shoulder to urge said ratchet flange and ratchet element into mutual engagement;
   (f) seal means carried by said shaft and said ratchet body and engageable with the housing of said brake operating mechanism to isolate said ratchet flange and ratchet element;
   (g) and means for introducing lubricant into the socket of said ratchet body to lubricate said ratchet flange and ratchet element;
   (h) and means interconnecting said ratchet body and brake operating mechanism to effect oscillation of said ratchet body thereby to advance said worm shaft and worm.

References Cited by the Examiner
UNITED STATES PATENTS

| 2,735,354 | 5/54 | MacDougall | 188—196 |
| 2,752,009 | 6/56 | MacDougall | 188—196 |
| 2,920,724 | 1/60 | Margetic et al. | 188—196 |

ARTHUR L. LA POINT, *Primary Examiner.*

DUANE A. REGER, *Examiner.*